(12) United States Patent
Takase et al.

(10) Patent No.: US 8,567,127 B2
(45) Date of Patent: Oct. 29, 2013

(54) GLASS RUN

(75) Inventors: Tomohiro Takase, Aichi-ken (JP);
Norimasa Iwasa, Aichi-ken (JP);
Masanori Aritake, Aichi-ken (JP);
Satoshi Toki, Aichi-ken (JP)

(73) Assignee: Toyoda Gosei Co., Ltd.,
Nishikasugai-Gun, Aichi-Ken (JP)

( * ) Notice: Subject to any disclaimer, the term of this patent is extended or adjusted under 35 U.S.C. 154(b) by 968 days.

(21) Appl. No.: 11/790,602

(22) Filed: Apr. 26, 2007

(65) Prior Publication Data
US 2007/0251152 A1 Nov. 1, 2007

(30) Foreign Application Priority Data

Apr. 28, 2006 (JP) ................ P-2006-124663

(51) Int. Cl.
*E05D 15/16* (2006.01)
(52) U.S. Cl.
USPC ................ 49/440; 49/441; 49/428
(58) Field of Classification Search
USPC .................... 49/428, 440, 441
See application file for complete search history.

(56) References Cited

U.S. PATENT DOCUMENTS

| | | | | |
|---|---|---|---|---|
| 5,150,542 | A * | 9/1992 | Hannya et al. | 49/441 |
| 5,779,956 | A | 7/1998 | Hollingshead et al. | |
| 6,389,754 | B2 | 5/2002 | Nozaki | |
| 6,412,226 | B1 | 7/2002 | Nozaki et al. | |
| 7,487,615 | B2 * | 2/2009 | Watanabe et al. | 49/441 |
| 2002/0046499 | A1 * | 4/2002 | Nozaki et al. | 49/441 |
| 2005/0198906 | A1 * | 9/2005 | Fujita et al. | 49/428 |
| 2006/0248802 | A1 * | 11/2006 | Tamaoki et al. | 49/441 |

FOREIGN PATENT DOCUMENTS

| | | |
|---|---|---|
| JP | 50-116235 U | 9/1975 |
| JP | 55-44654 U | 10/1980 |
| JP | 58-23966 | 2/1983 |
| JP | 58-049775 A | 3/1983 |
| JP | 63-87309 | 4/1988 |
| JP | 93-17894 | 6/1993 |
| JP | 10-119583 A | 5/1998 |
| JP | 2000-33822 | 2/2000 |
| JP | 2000-72907 | 3/2000 |
| JP | 2005-247151 A | 9/2000 |
| JP | 2001-219745 | 8/2001 |
| JP | 2002-178769 A | 6/2002 |
| JP | 2002-187432 | 7/2002 |
| JP | 2002-211247 | 7/2002 |

(Continued)

OTHER PUBLICATIONS

European Search Report dated Sep. 7, 2007.
Japanese Decision of Refusal dated Jun. 1, 2011 corresponding to Patent application No. 2006-124663 with an English-language translation thereof.
Japanese Decision of Refusal dated Jun. 1, 2011 corresponding to Patent application No. 2006-124665 with an English-language translation thereof.
Notification of Reason for Refusal dated Feb. 2, 2012, with English translation.
English translation of Notification of Reason(s) for Refusal dated Oct. 13, 2010.
Japanese Notification of Reasons for Refusal dated May 24, 2011 with an English-language translation thereof.

*Primary Examiner* — Gregory J. Strimbu
(74) *Attorney, Agent, or Firm* — McGinn IP Law Group, PLLC

(57) ABSTRACT

A sub-lip is provided on an interior side wall portion of a main body having a U-shaped cross section in a vertical section of a glass run. The sub-lip extends from the interior side wall portion of the main body while inclined towards an inner side of a glass opening. A projecting length of the sub-lip is set such that a distal end portion of the sub-lip is brought into contact with a back surface of an interior seal lip when a door glass is inserted into an inner space of the main body.

8 Claims, 10 Drawing Sheets

(56) References Cited

FOREIGN PATENT DOCUMENTS

| JP | 2002-331838 A | 11/2002 |
| JP | 2003-220640 A | 8/2003 |
| JP | 2004-196033 A | 7/2004 |
| JP | 2004-314875 | 11/2004 |
| JP | 2005-271677 A | 10/2005 |
| JP | 2005-329728 | 12/2005 |
| JP | 2006-15774 A | 1/2006 |

* cited by examiner

GLASS RUN

BACKGROUND OF THE INVENTION

1. Field of the Invention

The present invention relates to a glass run.

2. Related Art

In general, a glass run is provided along a circumferential end of a glass opening of a motor vehicle. The glass run is provided with extruded portions which are extruded substantially in straight line (or in an elongated fashion) and molded portions which each connect the extruded portions together in such a state that the extruded portions are connected together at a predetermined angle and includes, for example, a front vertical section, a top section and a rear vertical section so as to follow the shape of the glass opening. In addition, when viewed in a cross-sectional direction, the glass run has a main body which is provided with a base portion, and an interior side wall portion and an exterior side wall portion which extend from the base portion to thereby be formed substantially into a U-shape in cross section, an interior seal lip and an exterior seal lip, the interior seal lip and the exterior seal lip extending into an inner space of the main body from substantially distal ends of both the side wall portions, respectively. In the glass run, the main body is mounted on an inner part of a mounting frame (or a channel portion) which is provided to extend along the glass opening, whereby the door glass is sealed by the pair of seal lips on an internal side and an external side thereof.

In addition, as materials for forming the glass run, ethylene-α-olefin non-conjugated diene copolymer (EPDM), olefin-based thermoplastic elastomer (TPO) and the like are known.

Incidentally, there occurs from time to time a case where in sliding up and down, a door glass gets loosened or rattles when it is caused to vibrate in a transverse direction of a vehicle. To cope with this problem, conventionally, there has been proposed a technique in which a solid piece, a sponge member or the like is affixed to a predetermined part on an inner surface of the interior side wall portion of the glass run so as to support the interior seal lip which is deflected towards the inside of the vehicle when it is pushed by the door glass. In this case, although the looseness of the door glass is suppressed, since the solid piece or the sponge member needs to be affixed separately, there may be caused a fear that a reduction in working efficiency in manufacturing glass runs and an increase in production cost thereof are called for.

To cope with this problem, there has been proposed another technique in which a sub-lip is provided on the interior side wall portion so as to extend therefrom on the side of the inner space of the main body, so that the sub-lip is made to be brought into contact with an opposite surface (a back surface) of the interior seal lip to a glass contact surface thereof when the door glass is displaced largely towards the inside of the vehicle, so as to suppress the looseness of the door glass (for example, refer to JP-A-2000-33822).

Since the sub-lip and the interior side wall portion can be formed simultaneously by adopting the configuration described in JP-A-2000-33822, the reduction in working efficiency in manufacturing glass runs and increase in production costs thereof can be prevented. In the technique described in JP-A-2000-33822, however, it is not until the door glass is largely displaced towards the inside of the vehicle and as a result, the interior seal lip is largely deflected towards the inside of the vehicle that the interior seal lip is brought into contact with the sub-lip. Namely, the displacement of the door glass towards the inside of the vehicle is still suppressed or absorbed only by the internal seal slip until the interior seal lip is brought into contact with the sub-lip.

Moreover, the part of the back surface of the interior seal lip which is brought into contact with the sub-lip (or the distal end portion of the sub-lip) is set on a root portion side of the interior seal lip, and hence, the sub-lip of JP-A-2000-33822 was not such as to give an effective reaction force to the interior seal lip so as to allow the interior seal lip to return to its normal position.

Because of this, for example, in the event that the interior seal lip wears as a result of sliding contact with the door glass, whereby the elastic force (or the reaction force attempting to push back the door glass) is weakened, once it is pushed by the door glass, the interior seal lip deflects relatively easily towards the inside of the vehicle until it comes into contact with the sub-lip. Because of this, not only the effect to suppress the looseness of the door glass is reduced but also there is caused a concern that the sealing properties are decreased.

SUMMARY OF THE INVENTION

The invention was made in view of the situations, and an object thereof is to provide a glass run which can suppress the looseness of the door glass while suppressing the reduction in working efficiency in producing glass runs and increase in production costs thereof.

Hereinafter, several aspects of the invention suitable for attaining the object will be described one by one. Note that specific functions and advantages will also be described.

One aspect of the invention provides a glass run adapted to be mounted on an inner part of a mounting frame provided along a door glass opening of a vehicle, comprising:

a main body provided with a base portion, and an interior side wall portion and an exterior side wall portion which extend from the base portion to thereby be formed substantially into a U-shape in cross section;

an interior seal lip extending into an inner space of the main body substantially from a distal end of the interior side wall portion;

an exterior seal lip extending into the inner space of the main body substantially from a distal end of the interior side wall portion;

wherein a sub-lib is provided on the interior side wall portion in a section of the glass run which corresponds to a vertical edge of a door glass so as to extend substantially linearly on a side of the inner space of the main body while inclined towards an inner side of the door glass opening, the sub-lib being formed integrally with the interior side wall portion simultaneously to extrusion of the interior side wall portion, and a projecting length of the sub-lip is set such that a distal end portion of the sub-lip is brought into abutment with a back surface of the interior seal lip that is opposite to a glass contact surface thereof, when the door glass is inserted into the inner space of the main body.

According to the above aspect of the invention, the sub-lip is provided on the interior side wall portion so as to, extend therefrom substantially linearly on a side of the inner space of the main body while inclined, and when the door glass is inserted into the inner space of the main body, the distal end portion of the sub-lip is made to be brought into abutment (or contact) with the surface of the interior seal lip which is opposite to the glass contact surface thereof (that is, the back surface of the interior seal lip) at the part of the glass run where the door glass is inserted into the inner space of the main body. Because of this, in the event that the door glass attempts to be displaced towards the inside of the vehicle even by a slight amount, the interior seal lip and the sub-lip support, while being deflected, the door glass in such a way as to push it back in cooperation with each other. Consequently, compared to the configuration in which it is not until the door glass is largely displaced towards the inside of the vehicle and as a result, the interior seal lip is largely deflected towards the inside of the vehicle that the interior seal lip is brought into contact with the sub-lip, the sub-lip and the interior seal lip can start to cooperate with each other from the early stage to support the door glass, and hence, the looseness of the door glass can be suppressed in an ensured fashion.

Furthermore, even in the event that the interior seal lip wears to lose its elasticity as a result of sliding contact with the door glass to thereby weaken the elastic force (that is, the reaction force to push back the door glass) of the interior seal lip, the door glass, which attempts to be displaced towards the inside of the vehicle even by a small amount, can be supported by the sub-lip. Consequently, for example, compared to the configuration in which it is not until the door glass is largely displaced towards the inside of the vehicle and as a result, the interior seal lip is largely deflected towards the inside of the vehicle that the interior seal lip is brought into contact with the sub-lip, not only the function and advantage of suppressing the looseness of the door glass can be provided in an ensured fashion but also the reduction in sealing properties can be prevented. Note that the reduction in noise insulating properties can also be prevented by preventing the reduction in sealing properties.

In addition, since the sub-lip and the interior side wall portion are formed simultaneously, for example, compared to the case where the separate member (for example, the solid piece, the sponge member or the like) is affixed to the interior side wall portion, the reduction in working efficiency in manufacturing glass runs and increase in manufacturing costs thereof can be suppressed.

Note that when the door glass enters the inner space of the main body, it is desirable that the distal end portion of the sub-lip is brought into contact with the distal end portion (or a portion in the vicinity of the distal end portion) of the interior seal lip. As this occurs, the advantage that the sub-lip supports the interior seal lip, which is being deflected towards the inside of the vehicle, to thereby suppress the displacement of the door glass in cooperation with the interior seal lip is provided more reliably. Furthermore, by setting such that the distal end portion of the sub-lip and the distal end portion of the interior seal lip are brought into contact with each other, the interior seal lip is allowed to return to its normal position easily by taking a chance of the sub-lip exhibiting the reaction force. In addition, the sub-lip may be provided on the interior side wall portion of the glass run at a part which corresponds to a top side portion of the door glass. Furthermore, a sub-lip may be provided also on the exterior side wall portion so as to extend substantially linearly on a side of the inner space of the main body while inclined towards an inner side of the glass opening. Normally, however, since the normal position of the door glass is offset towards the outside of the vehicle to meet the demand for flush or semi-flush glass, no external sub-lip may be provided particularly.

Note that the description, "the door glass is inserted into the inner space of the main body" is intended to include the fact meaning, "the door glass which slides along a sliding track set in advance for the door glass is inserted into the inner space of the main body without being displaced in the transverse direction of the vehicle."

In the invention, a surface treatment to enhance a slidability of the sub-lip may be applied to the distal end portion of the sub-lip.

According to this aspect of the invention, a fear can be avoided that the distal end portion of the sub-lip and the back surface of the interior seal lip get sticking to each other. In addition, a fear can also be suppressed that the sub-lip and the interior seal lip rub against each other to get worn.

Note that as the surface treatment, such treatments can be raised as forming a sliding layer (for example, a polyethylene resin layer) or applying a coating (for example, a urethane coating) to the surface of the distal end portion of the sub-lip and using a formulation in which a sliding component which enhances the sliding properties is mixed into a material from which the sub-lip is made.

In the invention, a groove portion may be formed along a boundary portion between the sub-lip and the interior side wall portion.

According to this aspect of the invention, in conjunction with the fact that it is formed in a straight line, the sub-lip is made easy to be deformed in such a way as to fall towards the distal end portion side of the interior side wall portion about the boundary portion between the sub-lip and the interior side wall portion. Because of this, in the event that the door glass is largely displaced towards the inside of the vehicle, the interior seal lip and the sub-lip are deformed relatively smoothly while applying a force to push back the door glass. Consequently, a fear can be prevented that deterioration in sliding properties of the door glass is called for due to a force received by the door glass from the sub-lip via the interior seal lip becoming too large.

Note that the groove portion includes conceptually a notched portion, a cut-made portion, a recess, a thinned portion and the like. In addition, the groove portion may be formed at the time of extrusion.

In the invention, a first restricting projection may be provided on the interior seal lip along a part which lies on a distal side with respect to a part which is first brought into contact with the distal end portion of the sub-lip so as to project towards the interior side wall portion, the first restricting projection being formed integrally with the interior seal lip simultaneously to extrusion of the interior seal lip.

In the invention, a projecting length of the first restricting projection may be set to be 0.5 or more times and 1.8 or less times a thickness of the sub-lip.

In the invention, the first restricting projection may be made thicker than the sub-lip.

In the invention, a plurality of projections elongated along a longitudinal direction of the main body may be provided on the interior side wall portion at a part with which the sub-lip can be brought into contact, the projections being formed integrally with the interior side wall portion simultaneously to extrusion of the interior side wall portion.

In the invention, an accommodating recess towards an interior side of the vehicle may be formed at a part of the interior side wall portion with which the sub-lip can be brought into contact such that the projections are formed on a bottom portion of the accommodating recess, and viewed in a direction perpendicular to a direction in which the interior side wall portion extends, distal ends of the projections may lie on the interior side of the vehicle with respect to a surface of the interior side wall on which the accommodating recess is not formed.

In the invention, a ratio in area on the interior side wall portion of the part where the projections are formed to the part with which the sub-lip can be brought into contact may be 50% or more and 100% or less.

In the invention, a second restricting projection may be provided at a part of the interior seal lip which lies a proximal side with respect to a part which is first brought into contact with the distal end portion of the sub-lip, the second restricting projection being formed integrally with interior seal lip simultaneously to extrusion of the interior seal lip.

In the invention, the second restricting projection may be set such that an angle formed by the interior seal lip and a side portion of the second restricting projection which is on a side of the distal end portion of the interior seal lip constitutes an acute angle.

In the invention, a projecting length of the second restricting projection may be set to be 0.5 or more times and 1.5 or less times a thickness of the sub-lip.

In the invention, the sub-lip may be made from a foamed material and may be formed integrally with the interior side wall portion simultaneously to extrusion of the interior side wall portion.

In the invention, the interior side wall portion may be made from a solid material or a foamed material.

In the invention, the interior side wall portion may be made from an olefin-based thermoplastic elastomer and the sub-lip may be made from a dynamic crosslinking olefin-based thermoplastic elastomer, or the interior side wall portion and the sub-lip are made from an olefin-based rubber.

DETAILED DESCRIPTION OF THE PREFERRED EMBODIMENTS

First Embodiment

Figure 1:
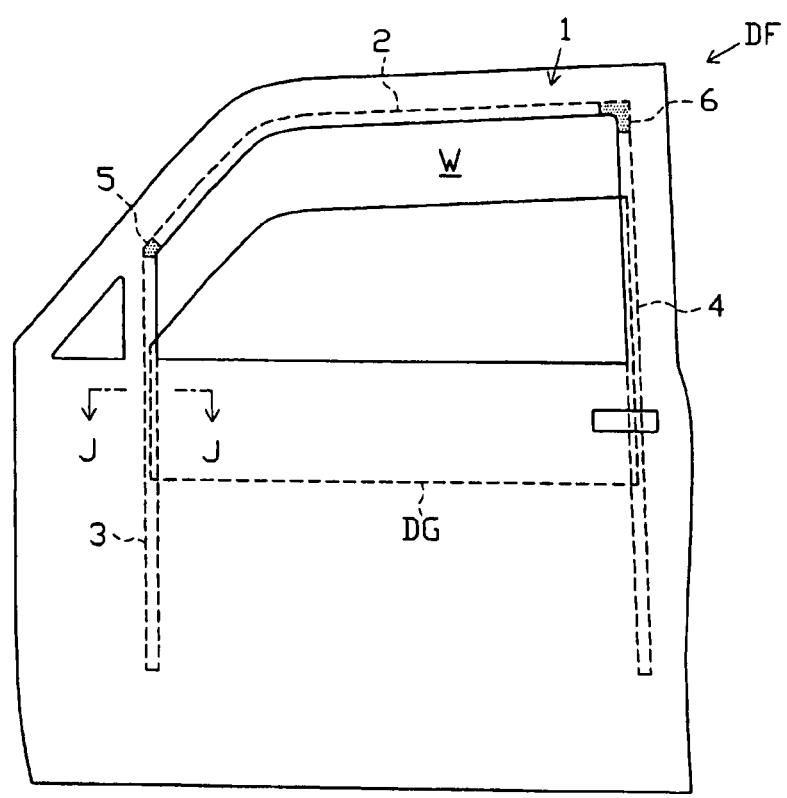
FIG. 1 is a front exemplary view which shows schematically the configuration of a door.
Figure 2:
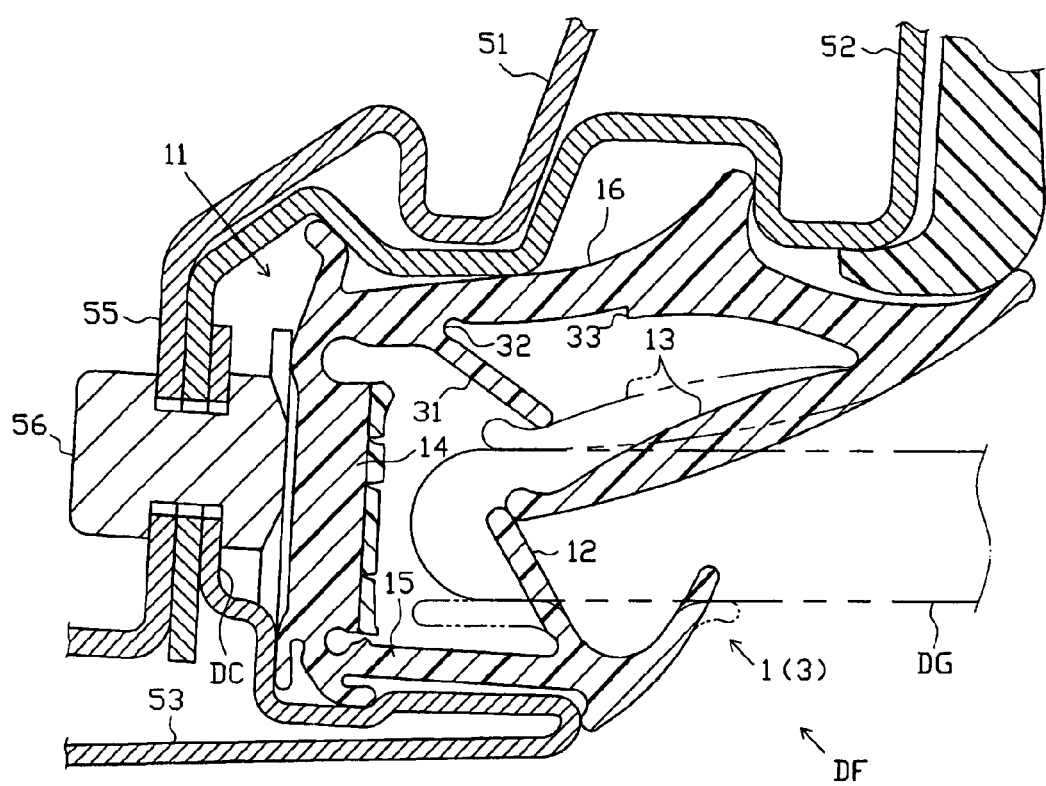
FIG. 2 is a cross-sectional view taken along the line J-J in FIG. 1 which shows the glass run according to the first embodiment.

Hereinafter, the first embodiment of the invention will be described by reference to the drawings. FIG. 1 is a front exemplary view which shows schematically the configuration of a door. FIG. 2 is a cross-sectional view taken along the line J-J in FIG. 1 which shows the configuration of a glass run.

As is shown in FIG. 1, a glass run 1 is mounted so as to follow an outer periphery of a glass opening W of an automotive door (a front door in the figure; hereinafter, referred to as a door DF). The glass run 1 is divided as viewed in a longitudinal direction thereof into an extruded portion 2 which corresponds to a top side portion, extruded portions 3, 4 which correspond to front and rear vertical sections, and molded portions 5, 6 (portions which are shaded with dispersed dots in FIG. 1) which connect together end portions of the extruded portions 2, 3 and end portions of the extruded portions 2, 4, respectively. The respective extruded portions 2 to 4 are extruded substantially in a straight line (or in an elongated fashion) by an extruding machine, not shown. The molded portions 5, 6 are molded by a molding apparatus, not shown, in such a state that the two extruded portions 2, 3 and the two extruded portions 2, 4 are connected to each other at predetermined angles, respectively.

As is shown in FIG. 2, the door DF includes an outer panel 51, an inner panel 52 and a molding member 53 which is attached to the panels 51, 52. To be more specific, end portions of the outer panel 51 and the inner panel 52 are bent to the outside of the vehicle and are then superposed one on the other to be formed into a flange portion 55, and the molding member 53 is fixedly attached to the flange portion 55 so formed with a rivet 56. In this embodiment, a groove (hereinafter, referred to a channel portion DC) with a substantially U-shaped cross section is formed by the inner panel 52 and the molding member 53. In addition, the channel portion DC is formed so as to follow an outer circumferential shape of the door DF, and the glass opening W, which is opened and closed by a door glass DG sliding up and down, is defined by this channel portion DC. Then, the glass run 1 is mounted on an inner part of the channel portion DC, and in this embodiment, the channel portion DC constitutes a mounting frame.

In addition, as is shown in FIG. 2, the extruded portion 3, which makes up the front side portion, includes a main body 11 provided with a base portion 14 which is fitted in the channel portion DC, and an exterior side wall portion 15 and an interior side wall portion 16 which extend from the base portion 14 to thereby be formed substantially into a U-shape in cross section, an exterior seal lip 12 and an interior seal lip 13, the exterior seal lip 12 and the interior seal lip 13 extending into an interior (or towards the base portion 14) of the main body 11 from substantially distal ends of the exterior side wall portion 15 and the interior side wall portion 16, respectively. With the glass opening W closed, a surface of the exterior seal lip 12 which constitutes a slide contact surface with the door glass DG (or a surface lying on an inner side of the glass opening W) is brought into press contact with an external surface of the door glass DG, and a surface of the interior seal lip 13 (or a surface lying on the inner side of the glass opening W) is brought into press contact with an inner surface of the door glass DG, whereby the door glass DG is sealed on the external side and the internal side thereof. Note that the extruded portions 2, 4 and the molded portions 5, 6 also each include a main body 11, a pair of seal lips 12, 13 and the like. In addition, the main body 11 and the seal lips 12, 13 of this embodiment are made from TPO (olefin-based thermoplastic elastomer).

In addition, the exterior side wall portion 15 is formed relatively short compared to the interior side wall portion 16, and in conjunction with this configuration, the exterior seal lip 12 is also set relatively small (or short) compared to the internal seal 13, whereby an external side surface of the molding member 53 can be set small, so that not only the appearance is enhanced but also the door glass is situated further outwards in the transverse direction of the vehicle so as to realize flush or semi-flush glass.

Now then, in this embodiment, a sub-lip 31 is provided on the interior side wall portion 16 of the extruded portion 3 which makes up the front vertical section so as to extend substantially linearly therefrom on a side of the inner space of the main body 11 while inclined towards an inner side of the door glass opening W. The sub-lip 31 is formed or extruded together with the interior side wall portion 16 simultaneously to extrusion of the interior side wall portion 16 through extrusion. A back surface of the interior seal lip 13 and a distal end portion of the sub-lip 31 are spaced apart from each other at a part on the extruded portion 3 when the door glass DG is not inserted into the inner space of the main body 11 and, when the door glass DG is inserted into the inner space of the main body 11, at a part on the extruded portion 3 the back surface of the interior seal lip 13 and the distal end portion of the sub-lip 31 are brought into contact with each other. In this embodiment, the distal end portion of the sub-lip 31 is set so as to be brought into contact with a distal end portion of the back surface of the interior seal lip 13.

In addition, in this embodiment, the sub-lip 31 is set such that with the main body 11 mounted in the channel portion DC, an angle formed by a surface (a surface on a base portion 14 side) of the sub-lip 31 and an inner surface of the door glass DG becomes an acute angle (about 35 degrees in this embodiment). However, the extending angle of the sub-lip 31 discussed here is an angle resulting in such a state that no stress is applied to the sub-lip 31. Furthermore, an extending or projecting length of the sub-lip 31 is made shorter than the interior seal lip 13 (in this embodiment, the sub-lip is 4.0 mm long, while the interior seal lip is 15 mm long). In addition, the sub-lip 31 is made thicker than the interior seal lip 13 (in this embodiment, the sub-lip is 0.7 mm thick, while the interior seal lip is 2.0 mm thick). In addition, the angle formed by the surface of the sub-slip 31 and the inner surface of the door glass DG is preferably 25 degrees or more and 45 degrees or less. The length of the interior seal lip 13 is preferably 8 mm or longer and 20 mm or shorter, and the thickness of the interior seal lip 13 is preferably 0.6 mm or thicker and 2.2 mm or thinner. The length of the sub-lip 31 is preferably 3.0 mm or longer and 4.5 mm or shorter, and the thickness of the sub-lip is preferably 0.4 mm thicker and 1.0 mm or thinner.

Additionally, a surface treatment is applied to the distal end portion of the sub-lip 31 in order to increase the sliding properties of the sub-lip 31 relative to the back surface of the interior seal lip 13. Furthermore, a notched portion 32 as a groove portion is formed on a back surface (a surface on a glass opening W side) of the sub-lip 31 at a boundary portion with the interior side wall portion 16. In addition, an accommodating recess 33 is formed on the interior side wall portion 16 for accommodating therein the sub-lip 31 when the sub-lip 31 is largely deflected towards the inside of the vehicle to thereby be shifted closer to the interior side wall portion 16. The notched portion 32 and the recess 33 are formed together with the interior side wall portion 16 simultaneously to extrusion of the interior side wall portion 16. Note that as the surface treatment, as the surface treatment, such treatments can be raised as forming a sliding layer (for example, a polyethylene resin layer) or applying a coating (for example, a urethane coating) to the surface of the distal end portion of the sub-lip 31 and using a formulation in which a sliding component which enhances the sliding properties is mixed into a material from which the sub-lip 31 is made. In particular, when a sliding layer is formed on the surface of the distal end portion of the sub-lip 31 or when a sliding component for enhancing sliding properties is mixed in to a material from which the sub-lip 31 is formed, such a surface treatment can so applied simultaneously to extrusion of the sub-lip 31, thereby making it possible to enhance the workability.

Next, the deforming operation of the interior seal lip 13 and the sub-lip 31 will be described. When the door glass DG is gradually raised to cover the glass opening W, as is shown by chain double-dashed lines in FIG. 2, the door glass DG is inserted into the inner space of the main body 11. As this occurs, the seal lip 12, 13 are pushed by the door glass DG and are slightly deflected, whereby door glass sliding contact surfaces of the seal lips 12, 13 are brought into press contact with the outer and inner surfaces of the door glass DG. In this embodiment, when the door glass DG is inserted into the inner space of the main body 11, the distal end portion of the sub-lip 31 is brought into contact with the back surface of the interior seal lip 13.

In addition, for example, in the event that the door glass DG gets loosened and is displaced towards the inside of the vehicle as the door glass DG is raised further, the interior seal lip 13 is pushed by the door glass DG and is deformed so as to fall towards a proximal end portion side of the interior side wall portion 16 about a connecting portion between the interior seal lip 12 and the interior side wall portion 16. Furthermore, linking with the deformation of the interior seal lip 13 (or being pushed by the interior seal lip 13), the straight-line sub-slip 31 is deformed so as to fall towards a distal end portion side of the interior side wall portion 16 about a boundary portion between the sub-lip 31 and the interior side wall portion 16 while in sliding contact with the back surface of the interior seal lip 13 at the distal end portion thereof. Thus, there may be no occurrence where a reaction force to push back the door glass DG is increased drastically while both the sub-lip 31 and the interior seal lip 13 are deflected together, and because of this, a deterioration in sliding properties of the door glass DG due to the door glass DG being strongly pressed by the sub-lip 31 and the interior seal lip 13 may be avoided.

Note that as on the extruded portion 3, on the extruded portion 4 which makes up the rear vertical section, a sub-lip 31 is also provided on an interior side wall portion 16 so as to extend substantially linearly therefrom towards an inner space of a main body 11 while inclined towards the glass opening W.

As has been described in detail heretofore, according to the embodiment, the sub-lip 31 is provided which extends from the interior side wall portion 16 on a side of the inner space of the main body 11, and the distal end of the sub-lip 31 so provided is made to be brought into contact with the back surface of the distal end portion of the interior seal lip 13 at the part of the glass run where the door glass DG is inserted into the inner space of the main body 11. Because of this, when the door glass DG attempts to be displaced towards the inside of the vehicle even by a small amount, the interior seal lip 13 and the sub-lip 31 cooperate with each other to support the door glass DG so as to push it back while both the interior seal lip 13 and the sub-lip 31 are being deflected. Consequently, compared to the configuration in which it is not until the door glass DG is largely displaced towards the inside of the vehicle and as a result, the interior seal lip 13 is largely deflected towards the inside of the vehicle that the interior seal lip 13 is brought into contact with the sub-lip 31, the sub-lip 31 and the interior seal lip 13 can start to cooperate with each other from the early stage to support the door glass DG, and hence, the looseness of the door glass DG can be suppressed in an ensured fashion. Furthermore, since the distal end portion of the sub-lip 31 and the distal end portion of the seal lip 13 are set so as to be brought into contact with each other, the interior seal lip 13 is allowed to return easily to its normal position by making full use of the reaction force of the sub-lip 31.

Furthermore, even in the event that the elastic force (or the reaction force to push back the door glass DG) of the interior seal lip 13 is weakened as a result of the sliding contact with the door glass DG or deformation resulting from aging, the door glass DG attempting to be displaced towards the inside of the vehicle even by a small amount can be supported by sub-lip 31. Consequently, for example, compared to the configuration in which it is not until the interior seal lip 13 is largely deflected that the interior seal lip 13 and the sub-lip 31 are brought into contact with each other, the function and advantage that the looseness of the door glass DG can be suppressed can be provided in an ensured fashion, thereby making it possible to prevent the reduction in sealing properties. Note that the reduction in noise insulation properties can also be prevented by enabling the prevention of reduction in sealing properties.

In addition, when adopting the configuration in which it is not until the door glass DG is largely displaced towards the inside of the vehicle and as a result, the interior seal lip 13 is largely deflected towards the inside of the vehicle that the interior seal lip 13 and the sub-slip 31 are brought into contact with each other, the aging deformation of only the interior seal lip 13 is prompted, and the reaction force to push back the door glass DG is weakened, whereby it becomes impossible to realize the flush or semi-flush glass in the door glass DG, and moreover, a fear is called for that the door glass DG is attracted towards the inside of the vehicle. In this regard, according to the embodiment, even in the event that the elastic force of the interior seal lip 13 is weakened, since the door glass DG can be supported by the sub-lip 31 when the door glass DG attempts to be displaced towards the inside of the vehicle even by a small amount, the aforesaid drawbacks can be suppressed.

Additionally, since the sub-lip 31 and the interior side wall portion 16 are formed simultaneously, for example, compared to the case where the separate member (for example, a solid piece, a sponge member or the like) is affixed to the interior side wall portion 16, the reduction in working efficiency and increase in production costs can be suppressed.

Furthermore, in the event that a projecting portion (or a thick portion) is provided which projects from the interior side wall portion 16 on a side of the inner space of the main body 11 and is formed together with the interior side wall portion 16 through extrusion, the interior seal lip 13 comes to a so-called bottoming state at the point in time at which the interior seal lip 13 comes into contact with the projecting portion, causing a fear that deterioration in sliding properties of the door glass DG is called for. In this regard, according to the embodiment, since the interior seal lip 13 further continues to be deflected towards the inside of the vehicle even after the sub-lip 31 has come into contact with the sub-lip 31, the occurrence of the aforesaid drawback can be suppressed.

In addition, when the interior seal lip 13 is deflected in such a way as to fall towards the proximal end portion side of the interior side wall portion 16, a force is applied which causes the interior side wall portion 16 to be deformed in such a way as to fall on a side of the inner space of the main body 11. Because of this, for example, when adopting a configuration in which the sub-lip extends on a side of the inner space of the main body 11 while inclined towards a base portion 14 side (or extends substantially parallel to the interior seal lip 13), the sub-lip is deflected towards the inside of the vehicle together with the interior seal lip 13, whereby a fear may be caused that the aforesaid force is enhanced. Namely, a fear is caused that the connecting portion between the interior side wall portion 16 and the interior seal lip 13 and the channel portion DC are separated apart from each other, calling for a fear that the external appearance quality is deteriorated. In this regard, according to the invention, the sub-lip 31 extends substantially linearly on a side of the inner space of the main body 11 while inclined towards the inner side of the glass opening W. Because of this, the sub-lip 31 is deformed in such a way as to fall from its root portion (a proximal end portion) as a starting point, whereby a force is produced which attempts to suppress the aforesaid force. Consequently, the displacement of the connecting portion between the interior side wall portion 16 and the interior seal lip 13 on a side of the inner space of the main body 11 can be suppressed, thereby making it possible to prevent the reduction in external appearance quality.

In addition, the surface treatment is applied to the distal end portion of the sub-slip 31 in order to enhance sliding properties. Because of this, a fear can be avoided that the distal end portion of the sub-slip 31 and the back surface of the interior seal lip 13 get sticking to each other. In addition, a fear can also be suppressed that the sub-lip 31 and the interior seal lip 13 rub against each other to get worn.

Furthermore, the notched portion 32 is formed at the boundary portion between the sub-lip 31 and the interior side wall portion 16. Because of this, the straight-line sub-lip 31 is made easy to be deformed in such a way as to fall towards the distal end portion side of the interior side wall portion 16 about the boundary portion between the sub-lip 31 and the interior side wall portion 16. Because of this, in the event that the door glass DG is largely displaced towards the inside of the vehicle, the interior seal lip 13 and the sub-lip 31 are deformed relatively smoothly while applying a reaction force to push back the door glass DG. Consequently, a fear can be prevented that deterioration in sliding properties of the door glass DG is called for due to a force received by the door glass DG from the sub-lip 31 via the interior seal lip 13 becoming too large.

In addition, the accommodating recess 33 is formed on the interior side wall portion 16 for accommodating therein the sub-slip 31 when the sub-slip 31 is largely deflected towards the inside of the vehicle so as to be attracted towards the interior side wall portion 16. Because of this, a deformation amount of the sub-slip 31 until the sub-slip 31 comes into contact with the interior side wall portion 16 can be increased, thereby making it possible to absorb the looseness of the door glass DG more by an extent equaling such an increase in the deformation amount.

In addition, the sub-lip 31 and the interior seal lip 13 are separated apart from each other in such a state that the door glass DG is not inserted into the inner space of the main body 11. Because of this, an initial load resulting in inserting the door glass DG into the inner space of the main body 11 can be reduced. As a result, an increase in sliding properties of the door glass DG can be realized.

Furthermore, compared to the configuration in which the looseness of the door glass DG is suppressed by extending the interior seal lip 13, the invention can avoid a fear that the door glass DG is attracted towards the outside of the vehicle too close by the interior seal lip 13, the reduction in sliding properties being thereby called for.

Note that the invention is not limited to what has been described heretofore, and hence, the invention may be carried out, for example, as below. Of course, other applications and modifications than those which will be described below can also be included.

Figure 3:
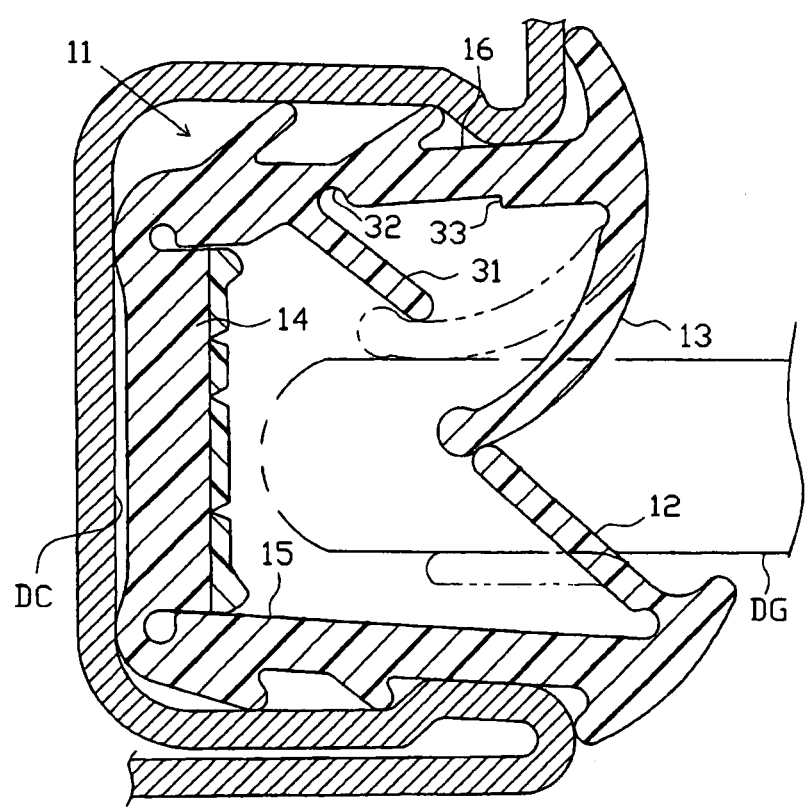
FIG. 3 is a cross-sectional view of the glass run of one modification of the first embodiment.
Figure 4:
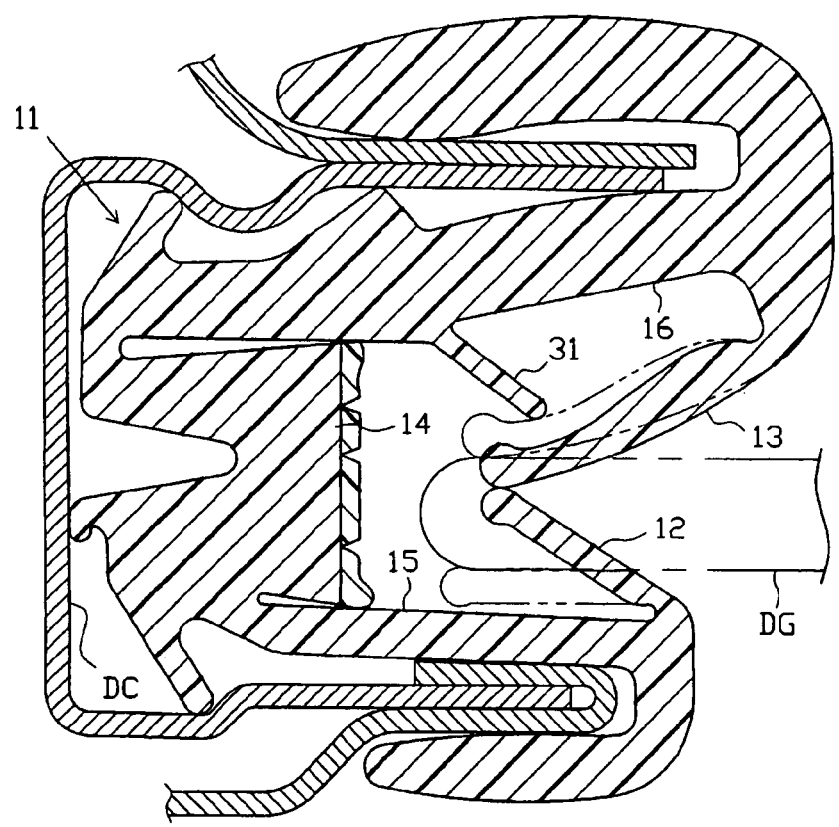
FIG. 4 is a cross-sectional view of the glass run of another modification of the first embodiment.

While in the embodiments, the sub-lip 31 is provided on the glass run 1 of the type in which the glass run 1 is mounted in the channel portion DC which is provided with the inner panel 52 and the molding member 53, the invention is not limited particularly to such a configuration. For example, the sub-slip 31 may be provided on a glass run which is mounted in a channel portion DC with a substantially U-shaped cross section which is formed in a sashed door as shown in FIG. 3, or the sub-lip 31 may be provided on a glass run which is mounted in a channel portion DC with a substantially U-shaped cross section which is formed in a door such as a pressed-type door as shown in FIG. 4.

In addition, the sub-lip 31 may be provided on the interior sidewall portion 16 of the part (the extruded portion 2) of the glass run 1 which corresponds to the top side portion of the door glass DG. Furthermore, a sub-slip may be provided on the exterior side wall portion 15 so as to extend substantially linearly therefrom on a side of the inner space of the main body 11 while inclined towards the inner side of the glass opening W.

The shape of the notched portion 32 in the embodiments is not limited particularly, and hence, the notched portion 32 is formed into any shape, provided that the shape is such that the sub-slip 31 is allowed to be deformed in such a way as to fall. In addition, the notched portion 32 is such as to prevent the reduction of the sliding properties of the door glass DG due to the rigidity of the sub-lip 31 being too high, and in the event that the sub-lip 31 is allowed to be deformed in such a way as to fall without the provision of the notched portion 32, the notched portion may be omitted. Of course, since the sub-lip 31 is such as to support the door glass DG which is displaced towards the inside of the vehicle in cooperation with the interior seal lip 13, the size and shape of the notched portion 32 can be modified so as to obtain the required elastic force in the sub-lip 31, or the notched portion 32 can be omitted, provided that the required elastic force is obtained.

The accommodating recess 33 in the embodiment may be omitted. In particular, in the event that an interior width of the main body 11 is set to be quite larger than the thickness of the door glass DG, or for example, as is shown in FIG. 4, in the event that at least the part of the interior side wall portion 16 with which the sub-lip 31 can be brought into contact is inclined towards the inside of the vehicle and a large space is formed between the relevant part and the sub-slip 31, since the deformation amount of the sub-lip 31 until the sub-lip 31 comes into contact with the interior side wall portion 16 is increased, the same function and advantage as those provided by embodiment can be provided without the accommodating recess 33.

While in the embodiments, the sub-lip 31 and the interior seal lip 13 are separated apart from each other in such a state that the door glass DG is not inserted into the inner space of the main body 11, the sub-lip 31 and the interior seal lip 13 may be in contact with each other even though the door glass DG is not inserted into the inner space of the main body 11. As this occurs, the looseness of the door glass DG can be suppressed more reliably, and even in the event that the interior seal lip 13 gets worn to lose its own original physical properties, the flush or semi-flush glass can still be realized by the sub-slip 31. However, a setting is required which takes it into consideration that the door glass DG is attracted towards the outside of the vehicle excessively.

Second Embodiment

Figure 5:
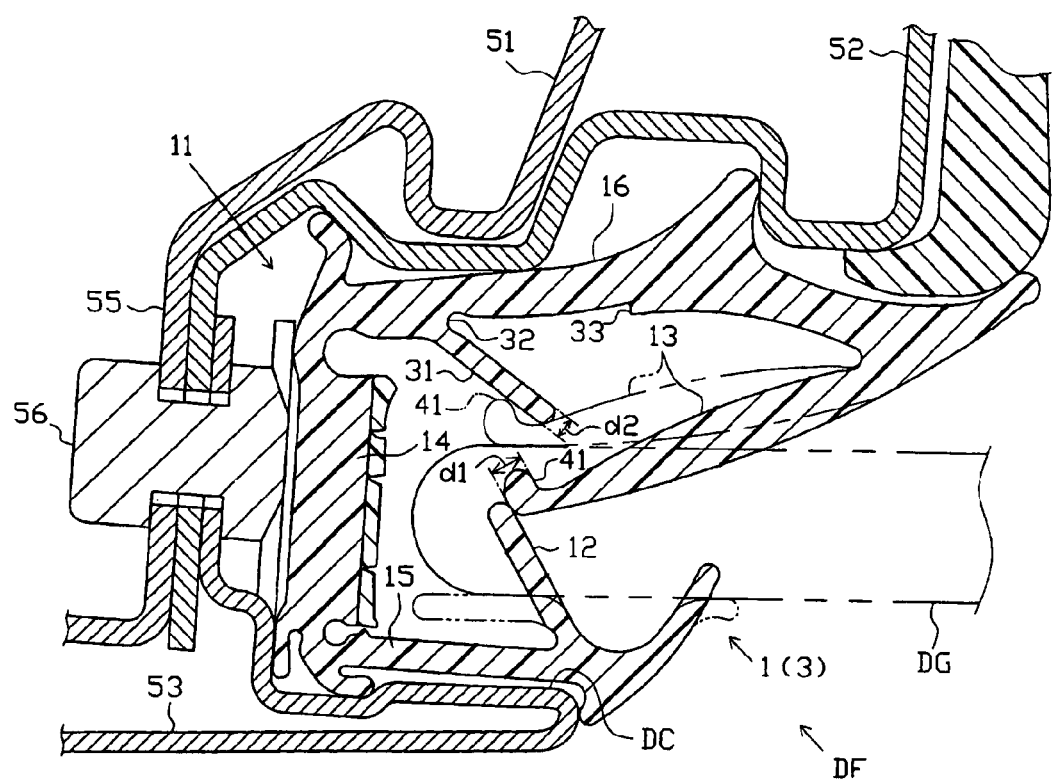
FIG. 5 is a cross-sectional view taken along the line J-J in FIG. 1 which shows the glass run according to the second embodiment.

Next, the cross-sectional shape of the glass run 1 of the second embodiment will be described with reference to FIG. 5. The second embodiment differs from the first embodiment only in that a restricting projection 41 (first restricting projection) is provided at the distal end portion of the interior seal lip 13 so as to project therefrom towards the interior side wall portion 16, and different points will be mainly described, and explanation of similar portions to those of the first embodiment will be omitted.

In the glass run 1 according to the second embodiment, the restricting projection 41 (first restricting projection) is provided at the distal end portion of the interior seal lip 13 so as to project therefrom towards the interior side wall portion 16. The restricting projection 41 is formed together with the interior seal lip 13 simultaneously to extrusion of the interior seal lip 13. In addition, in this embodiment, a thickness d1 of the restricting projection 41 is made thicker than a thickness d2 of the sub-lip 31. In addition, a projecting length of the restricting projection 41 is set to be 1.0 to 1.5 times the thickness of the sub-lip 31.

Next, the deforming operation of the interior seal lip 13 and the sub-lip 31 will be described. When the door glass DG is gradually raised to cover the glass opening W, as is shown by chain double-dashed lines in FIG. 5, the door glass DG is inserted into the inner space of the main body 11. As this occurs, the seal lip 12, 13 are pushed by the door glass DG and are slightly deflected, whereby the seal lips 12, 13 are brought into press contact with the outer and inner surfaces of the door glass DG. In addition, in this embodiment, when the door glass DG is inserted into the inner space of the main body 11, the distal end portion of the sub-lip 31 is brought into contact with (at a part slightly on a proximal side with respect to the distal end portion of) the back surface of the interior seal lip 13.

In addition, for example, in the event that the door glass DG gets loosened and is displaced towards the inside of the vehicle as the door glass DG is raised further, the interior seal lip 13 is pushed by the door glass DG and is caused to fall towards a proximal end portion side of the interior side wall portion 16 about a connecting portion between the interior seal lip 12 and the interior side wall portion 16. Furthermore, linking with the deformation of the interior seal lip 13 (or being pushed by the interior seal lip 13), the sub-slip 31 is deformed so as to fall towards a distal end portion side of the interior side wall portion 16 about a boundary portion between the sub-lip 31 and the interior side wall portion 16 while in sliding contact with the back surface of the interior seal lip 13 at the distal end portion thereof.

Note that as on the extruded portion 3, on the extruded portion 4 which makes up the rear vertical section, a sub-lip 31 is also provided on an interior side wall portion 16 so as to extend therefrom towards an inner space of a main body 11 while inclined towards the glass opening W, and a restricting projection 41 is also provided on an interior seal lip 13 so as to project from the distal end portion of the interior seal lip 13 towards the interior side wall portion 16.

As has been described in detail, in this embodiment, the sub-slip 31 is provided on the interior side wall portion 16 so as to extend therefrom on a side of the inner space of the main body 11 so as to be brought into contact with the back surface of the interior seal lip 13 at the distal end portion thereof. Because of this, when the door glass DG attempts to be displaced towards the inside of the vehicle, the interior seal lip 13 and the sub-lip 31 cooperate with each other to support the door glass DG in such a way as to push it back while both the interior seal lip 13 and the sub-lip 31 are both being deflected. Consequently, the looseness of the door glass DG can be suppressed.

In addition, the restricting projection 41 is provided at the distal end portion of the interior seal lip 13 for restricting a relative movement of the distal end portion of the sub-lip 31 which is in contact with the back surface of the interior seal lip 13 towards the distal end portion of the inside seal lip 13. Consequently, a fear can be suppressed that the distal end portion of the sub-lip 31 is positioned closer to the base portion 14 than the interior seal lip 13, and depending upon cases, (the distal end portion of) the interior seal lip 13 is positioned closer to the interior side wall portion 16 than (the distal end portion of) the sub-lip 31 (to thereby bring a front surface of the interior seal lip 13 into contact with the back surface of the sub-lip 31), whereby the interior seal lip 13 and the sub-lip 31 are caused to fall one on the other in an opposite way to that originally designed. As a result, a fear can be suppressed that the sealing properties are decreased, the effect of suppressing the looseness of the door glass DG is decreased or the realization of flush or semi-flush glass cannot be attained due to the interior seal lip 13 and the sub-lip 31 being caused to fall one on the other in the opposite way to that originally designed.

In addition, the accommodating recess 33 is formed on the interior side wall portion 16 for accommodating therein the sub-lip 31 when the sub-lip 31 is largely deflected towards the inside of the vehicle to thereby be attracted towards the interior side wall portion 16. Because of this, even when the restricting projection 41 is provided as has been described above, a fear can be prevented more reliably that the deformation amount of the sub-lip 31 until the sub-lip 31 is brought into contact with the interior side wall portion 16 is decreased.

In addition, since the movement of the distal end portion of the sub-lip 31 towards the distal end of the interior seal lip 13 is restricted by the restricting projection 41, a part of the interior seal lip which is first brought into contact with the distal end portion of the sub-lip can be set as close to the distal end portion as possible. By setting the first contact part of the interior seal lip 13 with the sub-lip 31 in this way, the function and advantage of this embodiment that the interior seal lip 13 and the sub-lip 31 cooperate with each other to support the door glass DG so as to push it back while they are both being deflected together can be provided more reliably.

Furthermore, apart from the configuration of this embodiment, it is considered that a fear can be suppressed by extending the interior seal lip that the sub-lip and the interior seal lip are caused to fall one on the other in the opposite way to that originally designed. As this occurs, however, there is caused a concern that the distal end portion of the interior seal lip is brought into contact with the base portion or the like when the interior seal lip is deflected, and when this concern actually comes true, there is a fear that a drawback is called for that the sliding properties of the door glass are deteriorated. In this regard, according to the embodiment, since the slide of the sub-lip 31 towards the distal end portion side of the interior seal lip 13 can be restricted without extending the interior seal lip 13 to such an extent, the aforesaid drawback can be avoided. Furthermore, a fear can also be avoided that the door glass DG is attracted towards the outside of the vehicle too much by the interior seal lip 13 which is too long, the reduction in sliding properties being thereby called for.

In addition, in the embodiment, a projecting length of the restricting projection 41 is set to be 1.0 or more times and 1.5 or less times the thickness of the sub-slip 31. Because of this, the relative movement of the distal end portion of the sub-lip 31 towards the distal end portion of the interior seal lip 13 can be restricted more reliably. Moreover, the existence of the restricting projection 41 can suppress to an extreme extent the occurrence of a situation where a distance between the interior seal lip 13 and the interior side wall portion 16 is reduced so that the interior seal lip 13 and the interior side wall portion 16 come nearer to each other, whereby the deformation amount of the sub-lip 31 and the interior seal lip 13 towards the inside of the vehicle is decreased. Consequently, a fear can be suppressed that the function and advantage that the looseness of the door glass DG is absorbed is reduced.

Furthermore, in this embodiment, the restricting projection 41 is made thicker than the sub-lip 31. Because of this, the rigidity of the restricting projection 41 can be enhanced, whereby the relative movement of the distal end portion of the sub-lip 31 to the distal end of the interior seal lip 13 can be restricted more reliably.

Figure 6:
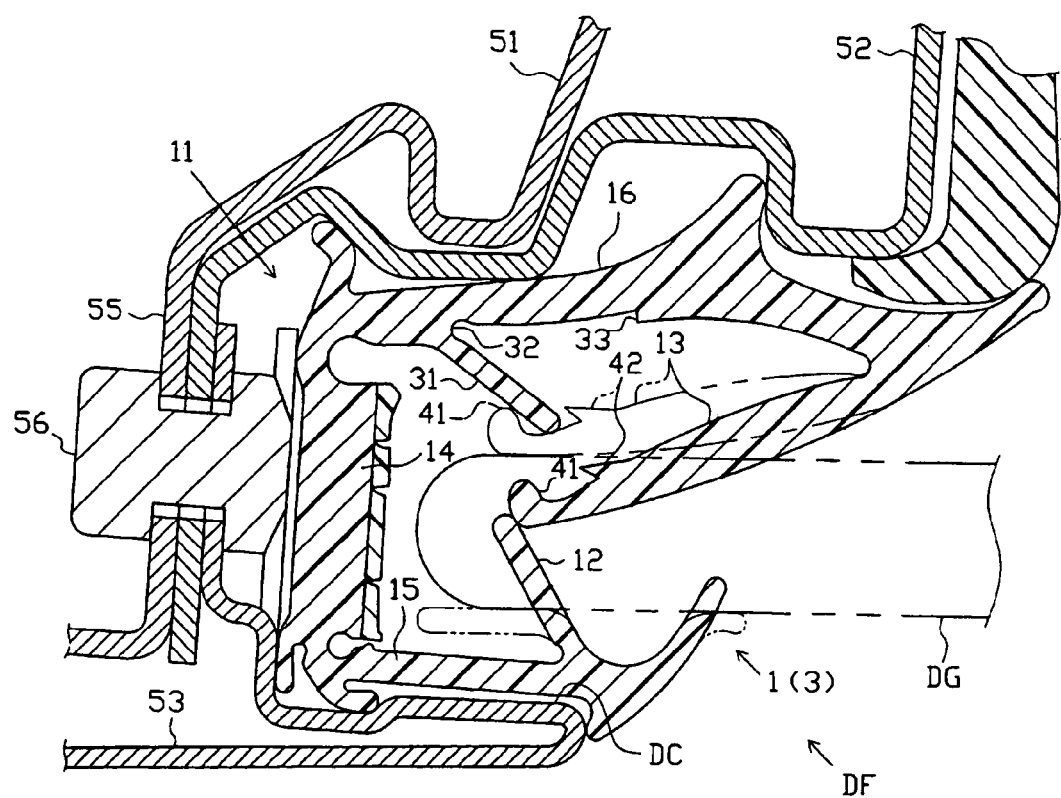
FIG. 6 is a cross-sectional view of the glass run of one modification of the second embodiment.

In the invention, a configuration may be adopted in which, along with the restricting projection 41 (first restricting projection), a bending restricting projection 42 (second restricting projection) is provided on the interior seal lip 13 at a part which lies on a proximal side with respect to the part which is first brought into contact with the distal end portion of the sub-lip 31 in such manner as to extend therefrom towards the interior side wall portion 16, the bending restricting projection 42 being formed integrally with the interior seal lip 13 simultaneously to extrusion of the interior seal lip 13, as is shown in FIG. 6. Detailed configuration and deformation of the second restricting projection 42 will be described later as the fourth embodiment.

A distance between the restricting projection 41 and the bending restricting projection 42 is set to be larger than the thickness of the distal end portion of the sub-lip 31 so that the distal end portion of the sub-lip 31 can be positioned between the restricting projection 41 and the bending restricting projection.

Third Embodiment

Figure 7:
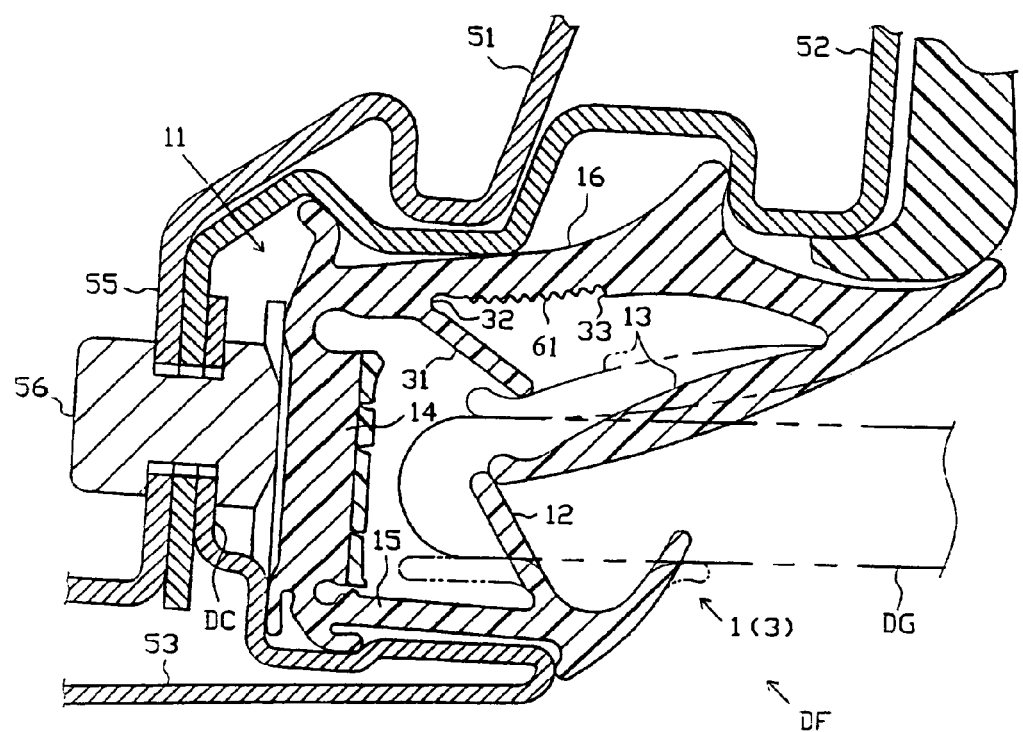
FIG. 7 is a cross-sectional view taken along the line J-J in FIG. 1 which shows the glass run according to the third embodiment.

Next, the cross-sectional shape of the glass run 1 of the third embodiment will be described with reference to FIG. 7. The third embodiment differs from the first embodiment only in that a plurality of projections 61 are provided at a part of the interior side wall portion 16 with which the sub-lip 31 can be brought into contact so as to be elongated in a longitudinal direction of the main body 11, and different points will be mainly described, and explanation of similar portions to those of the first embodiment will be omitted.

In the glass run 1 according to the third embodiment, a plurality of projections 61 are provided at a part of the interior side wall portion 16 with which the sub-lip 31 can be brought into contact so as to be elongated in a longitudinal direction of the main body 11. To be more specific, an accommodating recess 33 is formed on the interior side wall portion 16 by recessing the part with which the sub-lip 31 can be brought into contact, and nine projections 61 are provided at intervals of 0.6 mm over substantially the whole area of a bottom surface of the accommodating recess 33. The accommodating recess 33 and the projections 61 are formed integrally with the interior side wall portion 16 simultaneously to extrusion of the interior side wall portion 16.

In addition, as viewed in the transverse direction of the vehicle, the position of a distal end portion of the projection 61 is set to lie on the interior side of the vehicle with respect to a surface of the main body 11 which lies on a part of the interior side wall portion 16 where the accommodating recess 33 is not formed. Note that in this embodiment, a projecting length of the projection 61 from the bottom surface of the accommodating recess 33 is on the order of 0.3 mm. In addition, the projection 61 is configured so as to be gradually narrowed or tapered towards the distal end portion thereof (that is, the inner space of the main body 11).

Next, the deforming operation of the interior seal lip 13 and the sub-lip 31 will be described. When the door glass DG is gradually raised to cover the glass opening W, as is shown by chain double-dashed lines in FIG. 7, the door glass DG is inserted into the inner space of the main body 11. As this occurs, the seal lip 12, 13 are pushed by the door glass DG and are slightly deflected, whereby door glass sliding contact surfaces of the seal lips 12, 13 are brought into press contact with the outer and inner surfaces of the door glass DG. In this embodiment, when the door glass DG is inserted into the inner space of the main body 11, the distal end portion of the sub-lip 31 is brought into contact with the back surface of the interior seal lip 13.

In addition, for example, in the event that the door glass DG gets loosened and is displaced towards the inside of the vehicle as the door glass DG is raised further, the interior seal lip 13 is pushed by the door glass DG and is deformed so as to fall towards a proximal end portion side of the interior side wall portion 16 about a connecting portion between the interior seal lip 12 and the interior side wall portion 16. Furthermore, linking with the deformation of the interior seal lip 13 (or being pushed by the interior seal lip 13), the straight-line sub-slip 31 is deformed so as to fall towards a distal end portion side of the interior side wall portion 16 about a boundary portion between the sub-lip 31 and the interior side wall portion 16 while in sliding contact with the back surface of the interior seal lip 13 at the distal end portion thereof.

In addition, in the event that the door glass DG is displaced further largely towards the inside of the vehicle, whereby the interior seal lip 13 and the sub-lip 31 are deflected further largely towards the outside of the vehicle, the sub-lip 31 is brought into contact with the projections 61, so as to restrict a further displacement of the door glass DG towards the inside of the vehicle.

Note that as on the extruded portion 3, on the extruded portion 4 which makes up the rear vertical section, a sub-lip 31 is also provided on an interior side wall portion 16 so as to extend substantially linearly therefrom towards an inner space of a main body 11 while inclined towards the glass opening W.

According to this embodiment, the plurality of projections 61 are formed at the part of the interior side wall portion 16 with which the sub-lip 31 can be brought into contact. Namely, the irregularities are formed at the part with which the sub-lip 31 can be brought into contact when it is deflected largely towards the inside of the vehicle. Because of this, the total sum of the contact area between the sub-lip 31 and the interior side wall portion 16 can be reduced to a lower level. In addition, the contact part where the sub-lip 31 contacts the interior side wall portion 16 is divided by gaps formed between the projections 61 (to produce so-called line contacts therebetween). As a synergetic effect of these configurations, a fear can be prevented that the sub-lip 31 is joined to the interior side wall portion 16 to thereby be prevented from returning to its original position (that is, the position where the sub-lip 31 projects into the inner space of the main body 11). Consequently, the function and advantage that the sub-lip 31 and the interior side wall portion 16 cooperates with each other to support the door glass DG can be provided more reliably. Additionally, when the sub-lip 31 and the interior side wall portion 16 are brought into press contact with each other or are separated from each other from the state where they are in press contact with each other, a fear can be suppressed that abnormal noise is produced.

Additionally, apart from the configuration of this embodiment, it is considered that the joint between the sub-lip 31 and the interior side wall portion 16 can be suppressed by enhancing the sliding properties of the sub-lip 31 relative to the interior side wall portion 16 by forming a coating on or applying a separate member to the contact part where the sub-lip 31 contacts the interior side wall portion 16. In this case, however, since the operations described above need to be performed by wrapping up the sub-lip 31 and the interior seal lip 13, there is a fear that a reduction in working efficiency or the like is called for. In this regard, according to this embodiment, since the plurality of projections 61 are formed at the contact part where the sub-lip 31 contacts the interior side wall portion 16 integrally with the interior side wall portion 16 simultaneously to extrusion of the relevant side wall portion, the aforesaid drawback can be prevented.

Furthermore, according to this embodiment, the accommodating recess 33 is formed at the part of the interior side wall portion 16 with which the sub-slip 31 can be brought into contact, and the projections 61 are formed in the accommodating recess 33. Furthermore, as viewed in the transverse direction of the vehicle, the position of the distal end portion of the projection 61 is set to be positioned further inwards into the inside of the vehicle than the interior surface of the main body which lies on the part of the interior side wall portion where the accommodating recess is not formed (or the distal end portion of the projection 41 does not project further inwards into the inner space of the main body 11 than the interior surface of the interior side wall portion 16). Because of this the deformation amount of the sub-lip 31 until it comes into contact with the projections 61 can be increased, thereby making it possible to absorb the looseness of the door glass DG more by an extent equaling the increase in the deformation amount.

In addition, in the event that the projections are formed locally at the part of the interior side wall portion 16 where the sub-lip 31 can be brought into contact with the interior side wall portion 16 (or for example, only a single projection is formed), when the sub-lip 31 is largely deflected towards the inside of the vehicle to thereby be brought into contact with the projection, the sub-lip 31 is deformed so as to be bent, leading to a fear that the sub-lip 31 is brought into press contact with the part of the interior side wall portion 16 where no projection is provided over a relatively large surface area so as to be joined thereto. In this regard, according to this embodiment, the plurality of projections 61 are formed substantially over the whole area of the bottom surface of the accommodating recess, that is, substantially over the whole area of the contact part where the sub-lip 31 contacts the interior side wall portion 16. Consequently, the plurality of projection 61 are brought into contact with the sub-lip 31 over as wide an area as possible, the aforesaid fear can be suppressed.

In addition, by adopting the configuration in which the projection 61 tapers as it projects, the contact area between the sub-lip 31 and the individual projections 61 can be decreased, thereby making it possible to prevent the occurrence of a fear that the sub-lip 31 is joined to the projections 61 and is made difficult to be separated therefrom.

Additionally, for example, in the event that a plurality of projections are provided on the sub-lip, there is caused a concern that when the sub-lip, which is made relatively thin as a result of provision the projections, is brought into press contact with the interior side wall portion, the sub-lip is deformed in such a manner that the adjacent projections are separated apart from each other in such a way as to produce wider gaps therebetween. In this regard, according to the embodiment, by providing the projections 61 on the interior side wall portion 16 which is thicker than the sub-lip 31, the aforesaid deformation can be suppressed, and as a result, a fear can be suppressed that the sub-lip 31 and the interior side wall portion 16 are brought into contact with each other over the relative wide surface area.

Fourth Embodiment

Next, the cross-sectional shape of the glass run 1 of the fourth embodiment will be described with reference to FIGS.

8 and 9. The fourth embodiment differs from the first embodiment only in that a restricting projection 42 (second restricting projection) is provided at a part of the interior seal lip 13 which lies on a proximal side with respect to a part which is first brought into contact with the distal end portion of the sub-lip 31 so as to project towards the interior side wall portion 16, and different points will be mainly described, and explanation of similar portions to those of the first embodiment will be omitted.

In the glass run 1 according to the fourth embodiment, the restricting projection 42 (second restricting projection) is provided at a part of the interior seal lip 13 which lies on a proximal side with respect to a part which is first brought into contact with the distal end portion of the sub-lip 31 so as to project towards the interior side wall portion 16. In this embodiment, the restricting projection 42 is provided to project at a position where the distal end portion of the sub-lip 31 which is in contact with the back surface of the interior seal lip 13 comes into contact with the restricting projection 42 when the sub-lip 31 moves relatively towards a proximal end portion of the interior seal lip. The restricting projection 42 is formed integrally with the interior seal lip 13 simultaneously to extrusion of the interior seal lip 13.

In addition, a cross section of the restricting projection 42 is formed substantially into the shape of a scalene triangle in which an angle situated on the interior side wall portion side constitutes an apex. Of course, the apex may be rounded or be formed into a curved shape. In addition, in this embodiment, the restricting projection 42 is set such that an angle formed by a side portion of the restricting projection 42 which lies to face the distal end portion of the interior seal lip 13 and the internal seal 13 constitutes an acute angle (for example, an angle of 60 or more degrees and 85 or less degrees). In addition, a projecting length of the restricting projection 42 is set to be 0.5 or more times to 1.0 or less times the thickness of the sub-lip 31.

Figure 8:
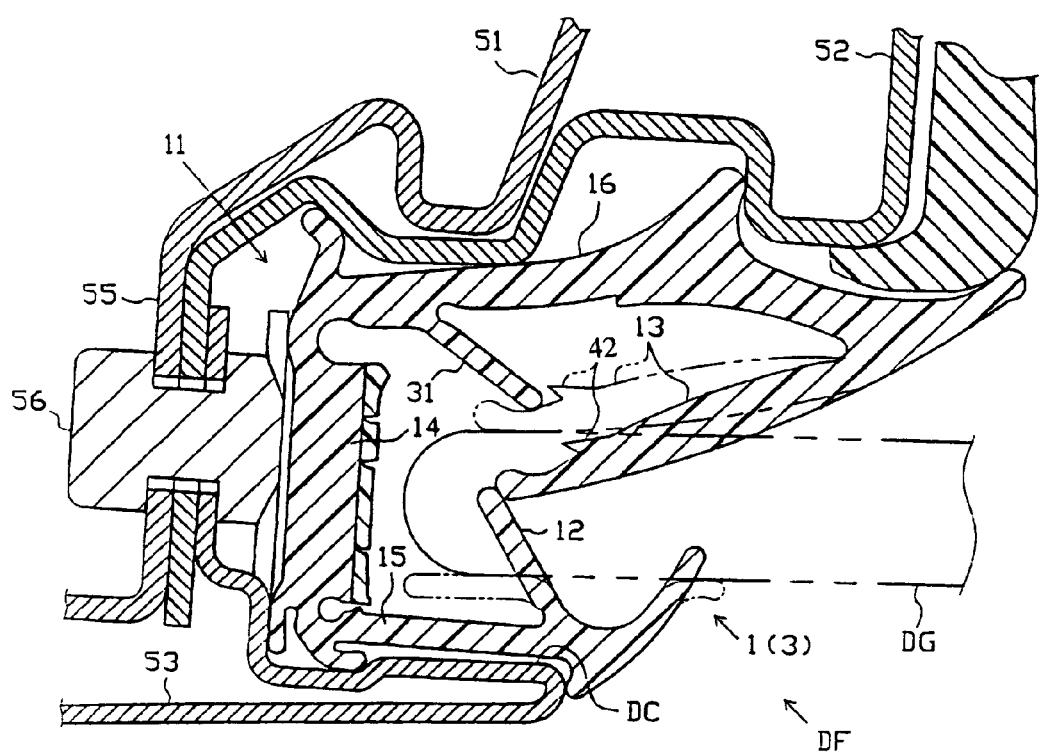
FIG. 8 is a cross-sectional view taken along the line J-J in FIG. 1 which shows the glass run according to the fourth embodiment.

Next, the deforming operation of the interior seal lip 13 and the sub-lip 31 will be described. When the door glass DG is gradually raised to cover the glass opening W, as is shown by chain double-dashed lines in FIG. 8, the door glass DG is inserted into the inner space of the main body 11. As this occurs, the seal lip 12, 13 are pushed by the door glass DG and are slightly deflected, whereby the seal lips 12, 13 are brought into press contact with the outer and inner surfaces of the door glass DG. In addition, in this embodiment, when the door glass DG is inserted into the inner space of the main body 11, the distal end portion of the sub-lip 31 is brought into contact with the back surface of the interior seal lip 13.

In addition, for example, in the event that the door glass DG gets loosened and is displaced towards the inside of the vehicle as the door glass DG is raised further, the interior seal lip 13 is pushed by the door glass DG and is caused to fall towards a proximal end portion side of the interior side wall portion 16 about a connecting portion between the interior seal lip 12 and the interior side wall portion 16. Furthermore, linking with the deformation of the interior seal lip 13 (or being pushed by the interior seal lip 13), the sub-slip 31 is deformed so as to fall towards a distal end portion side of the interior side wall portion 16 about a boundary portion between the sub-lip 31 and the interior side wall portion 16 while in sliding contact with the back surface of the interior seal lip 13 at the distal end portion thereof until the distal end portion of the sub-lip 31 comes into contact with the restricting projection 41.

Figure 9:
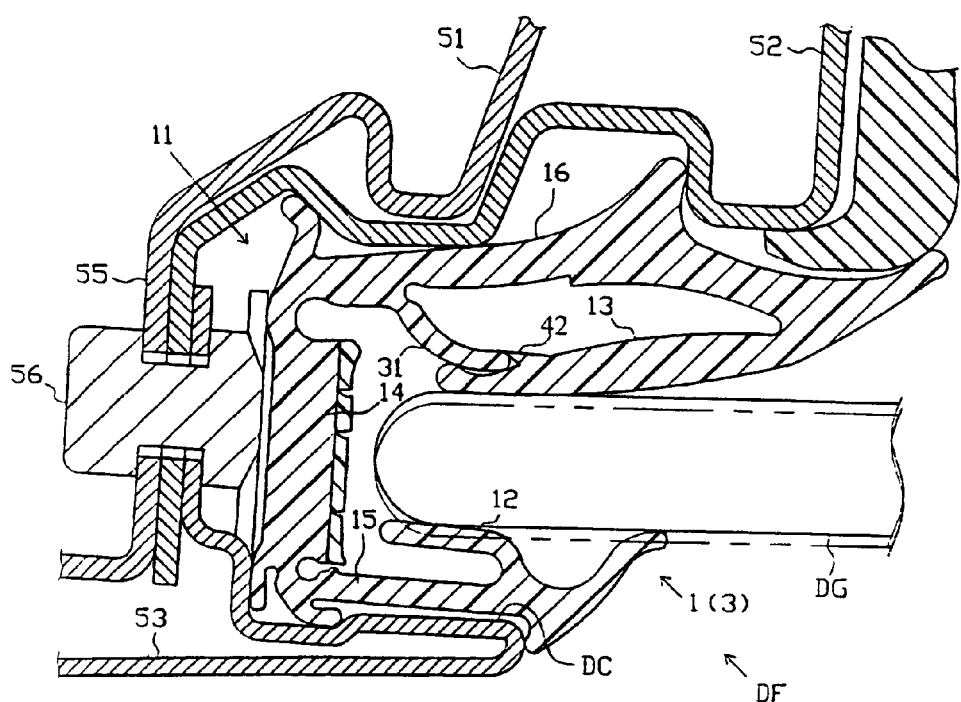
FIG. 9 is a cross-sectional view showing a deformation of the sub-lip according to the fourth embodiment.

Now then, as is shown in FIG. 9, when the distal end portion of the sub-lip 31 is brought into contact with the restricting projection 42, the relative movement (or slide) of the distal end portion of the sub-lip 31 towards the proximal end portion of the interior seal lip 13 is restricted by the restricting projection 42. Because of this, a hollow portion is defined by the interior seal lip 13, the interior side wall portion 16 and the sub-lip 31 in a pseudo fashion (or a pseudo hollow portion is defined thereby) in such a state that the distal end portion of the interior seal lip 13 is in contact with the restricting projection 42. When the door glass DG is displaced further towards the inside of the vehicle, the sub-lip 31 is deflected as whole, and the sub-lip 31 is deformed so as to be swollen on a side of the inner space of the main body 11. In addition, there is no chance where a force to push back the door glass DG is increased drastically during a time period when the sub-lip 31 is being deformed so as to be swollen into the inner space of the main body 11, and because of this, a fear can be avoided that deterioration in sliding properties of the door glass DG is called for due to the door glass DG being press held quickly and strongly by the sub-lip 31 and the interior seal lip 13.

Note that as on the extruded portion 3, on the extruded portion 4 which makes up the rear vertical section, a sub-lip 31 is also provided on an interior side wall portion 16 so as to extend therefrom towards an inner space of a main body 11 while inclined towards the glass opening W, and a restricting projection 42 is also provided on an interior seal lip 13 so as to project therefrom towards the interior side wall portion 16.

Thus, as has been described in detail heretofore, in this embodiment, the sub-lip 31 is provided on the interior side wall portion 16 so as to extend therefrom on a side of the inner space of the main body so as to be brought into contact with the back surface of the interior seal lip 13 at the distal end portion thereof. Because of this, when the door glass DG attempts to be displaced towards the inside of the vehicle, the interior seal lip 13 and the sub-lip 31 cooperate with each other to support the door glass DG so as to push it back while both the interior seal lip 13 and the sub-lip 31 are being deflected. Consequently, the looseness of the door glass DG can be suppressed.

In addition, the restricting projection 42 is provided on the interior seal lip 13 which restricts the slide of the distal end portion of the sub-lip 31 which is in contact with the back surface of the interior seal lip 13. Because of this, the sub-lip 31 is deflected as whole and is then deformed in such a way as to be swollen into the inner space of the main body 11 in such a state that the distal end portion of the sub-lip 31 is in contact with the restricting projection 42 to thereby be supported. Consequently, compared to the case where the sub-lip 31 slides while falling about the boundary portion between the sub-lip 31 and the interior side wall portion 16 while maintaining the shape thereof almost completely (or the shape thereof excluding the proximal end portion), the force to push back the door glass DG is allowed to act more reliably, and hence, the aforesaid function and advantage can be provided properly.

In addition, as has been described above, while the hollow portion (or the pseudo hollow portion) is eventually defined in the process where the door glass DG is inserted into the inner space of the main body 11 and is then displaced towards the inside of the vehicle, the hollow portion is not such as to be formed by extrusion. Because of this, a fear can be prevented that scattering of shapes of the hollow portion tends to be easily produced due to the hollow portion being formed through extrusion. Consequently, a fear can be prevented that there is caused scattering of forces which attempt to push back the door glass DG to thereby call for a reduction in sealing properties at a part of the glass run 1 where its elastic force becomes weak or a reduction in sliding properties of the door glass DG at a part of the glass run where its elastic force becomes strong.

Furthermore, since the sub-lip 31 is deflected as a whole to be deformed, a fear can be avoided that stress from the door glass DG is applied locally. Consequently, the start of deterioration of the sub-lip 31 can be delayed to an extreme extent. In addition, an increase in noise insulating properties can be realized due to the pseudo hollow portion being defined.

In addition, the restricting projection 42 is set such that the angle formed by the side portion of the restricting projection 42 which lies to face the distal end portion of the interior seal lip 13 and the interior seal lip 13 constitutes the acute angle. Because of this, the distal end portion of the sub-lip 31 is locked by the restricting projection 42 more reliably, whereby a fear can be suppressed that the distal end portion of the sub-lip 31 rides over the restricting projection 42 to perform the relative movement towards the proximal end side of the interior seal lip 13 relatively easily. Consequently, the relative movement of the distal end portion of the sub-lip 31 towards the proximal end portion side of the interior seal lip 13 can be restricted by the restricting projection 42 reliably, and hence, the aforesaid function and advantage can be provided reliably.

Furthermore, in this embodiment, the projecting length of the restricting projection 42 is set to be 0.5 or more times and 1.0 or less times the thickness of the sub-lip. Because of this, the relative movement of the distal end portion of the sub-lip 31 towards the proximal end portion side of the interior seal lip 13 can be restricted more reliably. Moreover, a situation can be avoided in which the deformation amount of the sub-lip 31 and the interior seal lip 13 towards the inside of the vehicle is decreased due to the restricting projection 42 coming into contact with the interior side wall portion 16 before the sub-lip 31 is brought into press contact with the interior side wall portion 16. Consequently, a fear can be avoided that the function and advantage that the looseness of the door glass DG can be absorbed are decreased.

While in the first to fourth embodiments, the main body 11 and the seal lips 12, 13 are made from TPO, they may be made from other materials such as EPDM.

Fifth Embodiment

Figure 10:
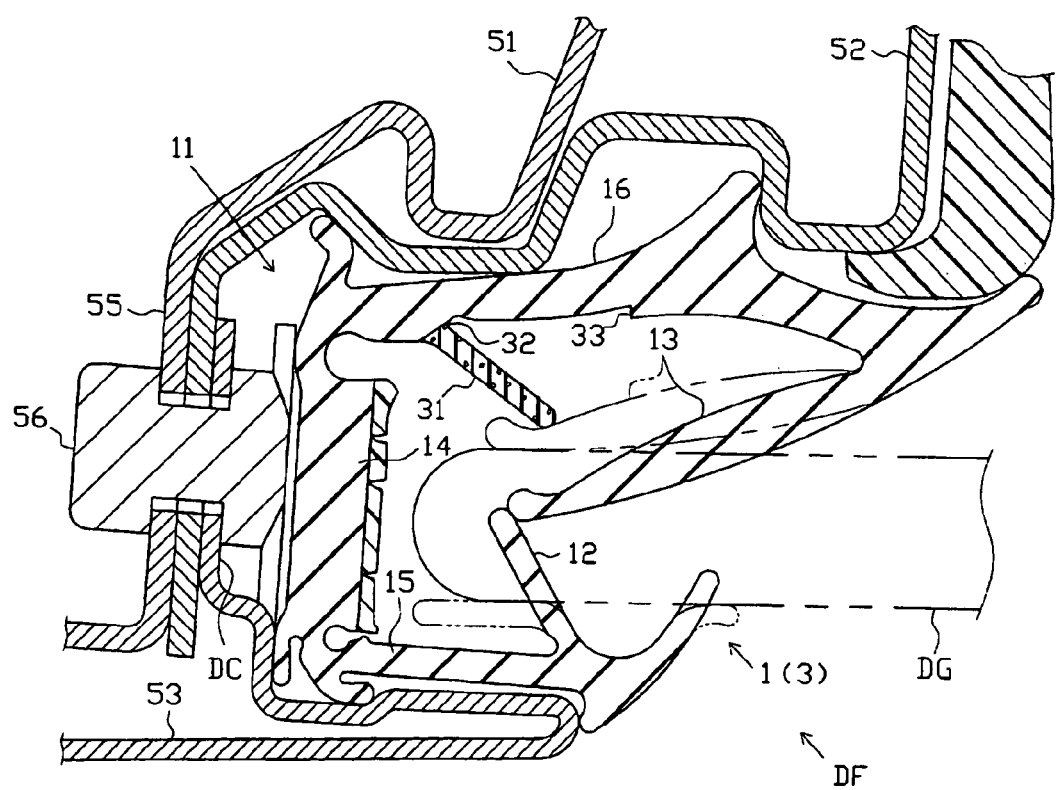
FIG. 10 is a cross-sectional view taken along the line J-J in FIG. 1 which shows the glass run according to the fifth embodiment.

Next, the cross-sectional shape of the glass run 1 of the fifth embodiment will be described with reference to FIG. 10. The fifth embodiment differs from the first embodiment only in that the main body 11 (the interior side wall portion 16) is made from an EPDM solid rubber, while the sub-lip 31 is made from an EPDM sponge rubber as a foamed material, and different points will be mainly described, and explanation of similar portions to those of the first embodiment will be omitted.

In the glass run 1 according to the fifth embodiment, the sub-lip 31 is provided on the interior side wall portion 16 of the extruded portion 3 which makes up the front vertical section so as to extend substantially linearly therefrom on a side of the inner space of the main body 11 while inclined towards the inner side of the door glass opening W. In this embodiment, as has been described above, the main body 11 (the interior side wall portion 16) is made from an EPDM solid rubber, while the sub-lip 31 is made from an EPDM sponge rubber as a foamed material. The sub-lip 31 is formed integrally with the interior side wall portion 16 simultaneously to extrusion of the interior side wall portion 16. In addition, while the back surface of the interior seal lip 13 and the distal end portion of the sub-lip 31 are separated apart from each other at a part of the extruded portion 3 where the door glass DG is not inserted into the inner space of the main body 11, at a part where the door glass DG is inserted into the inner space of the main body 11, the back surface of the interior seal lip 13 is made to be brought into contact with the distal end portion of the sub-lip 31. In this embodiment, the distal end portion of the sub-lip 31 is set to be brought into contact with a distal end portion of the back surface of the interior seal lip 13.

Thus, as has been described in detail heretofore, in this embodiment, the sub-lip 31 is provided on the interior side wall portion 16 so as to extend therefrom on a side of the inner space of the main body 11 so as to be brought into contact with the distal end portion of the back surface of the interior seal lip 13 at the distal end portion thereof. Because of this, when the door glass DG attempts to be displaced towards the inside of the vehicle, the interior seal lip 13 and the sub-lip 31 cooperate with each other to support the door glass DG so as to push it back while the interior seal lip 13 and the sub-lip 31 are both being deflected. Consequently, the looseness of the door glass DG can be suppressed. Furthermore, since the distal end portion of the sub-lip 31 is made to be brought into contact with the distal end portion of the interior seal lip 13, the interior seal lip 13 is allowed to return to its normal position easily by taking a chance of the sub-lip 31 exhibiting the reaction force.

In addition, the EPDM sponge rubber is difficult to be plastically deformed due to the existence of bubbles, compared to the EPDM solid rubber. Because of this, by making the sub-lip 31 from the EPDM sponge rubber as done in this embodiment, even in the event that the sub-lip 31 receives relatively large stress applied thereto from the door glass DG via the interior seal lip 13 and is then largely deformed towards the inside of the vehicle, a fear can be suppressed that the sub-lip 31 is deformed permanently by the stress so applied (that is, the sub-lip 31 cannot be restored to its original shape even after the stress is released from the door glass DG). Consequently, the function and advantage that the sub-lip 31 and the interior seal lip 13 cooperate with each other to support the door glass DG can be provided over a long period of time more reliably.

On the other hand, the main body 11 (the interior side wall portion 16) is made from an EPDM solid rubber. Because of this, the rigidity of the glass run 1 can be secured.

In addition, by making the sub-lip 31 from EPDM, for example, compared to a configuration in which the sub-lip is made from TPO, the function and advantage that the interior seal lip 13 which is being deflected towards the inside of the vehicle is supported by the sub-lip can be provided reliably while suppressing further the plastic deformation of the sub-lip 31. In addition, since both the interior side wall portion 16 and the sub-lip 31 are made from EPDM, the interior side wall portion 16 and the sub-lip 31 can be joined (thermally joined) together strongly.

In addition, since the sub-lip 31 is made from the foamed material (the EPDM sponge rubber), when the sub-lip 31 is brought into press contact with the interior side wall portion 16, the sub-lip 31 changes its shape in such a manner that the sub-lip 31 itself is compressed (or in such a manner that the contact part with the interior seal lip 13 is recessed towards the inside of the vehicle). Because of this, the looseness of the door glass DG can be absorbed more by such an effect. In addition, the deformation amount of the sub-lip 31 (the base portion 14 side surface of the sub-lip 31) can be increased more.

What is claimed is:
1. A glass run adapted to be mounted to an inner part of a mounting frame of a vehicle, said glass run comprising:

a main body provided with a base portion, and an interior side wall portion and an exterior side wall portion which extend from the base portion, said main body being substantially U-shaped in cross section and having an opening opposite said base portion;

an interior seal lip extending into an inner space of the main body from a distal end of the interior side wall portion so as to extend in a direction away from said opening of the main body; and an exterior seal lip extending into the inner space of the main body from a distal end of the exterior side wall portion, wherein a generally linear sub-lip is provided on the interior side wall portion in a section of the glass run which corresponds to a vertical edge of a door glass and extends generally linearly toward said opening of said main body, the sub-lip being integrally extruded with the interior side wall portion, wherein a first restricting projection is provided on a distal end of the interior seal lip on a back surface of said interior seal lip, said back surface of said interior seal lip generally facing the interior side wall portion and said first restricting projection projects towards the interior side wall portion, wherein a projecting length of the sub-lip is set such that a distal end portion of the sub-lip is first brought into abutment with said back surface of the interior seal lip that is opposite to a glass contact surface thereof between the first restricting projection and a base of the interior seal lip when the door glass is inserted into the inner space of the main body, wherein the sub-lip is brought into contact with the interior seal lip for an entirety of a time the door glass is inserted into the inner space of the main body, and wherein a surface treatment to enhance slidability of the sub-lip with respect to said interior seal lip is applied to the distal end portion of the sub-lip.

2. A glass run according to claim 1, wherein a groove is formed in the interior side wall portion adjacent where the sub-lip and the interior side wall portion connect.

3. A glass run according to claim 1, wherein the first restricting projection is integrally extruded with the interior seal lip.

4. A glass run according to claim 1, wherein a projecting length of the first restricting projection is set to be 0.5 to 1.8 times a thickness of the sub-lip.

5. A glass run according to claim 1, wherein the first restricting projection has a thickness greater than a thickness of the sub-lip.

6. A glass run according to claim 1, wherein a second restricting projection is provided on said back surface of the interior seal lip, the second restricting projection being integrally extruded with the interior seal lip.

7. A glass run according to claim 6, wherein a projecting length of the second restricting projection is set to be 0.5 to 1.5 times a thickness of the sub-lip.

8. A glass run according to claim 1, wherein the interior seal lip has a length of 8 mm to 20 mm and a thickness of 0.6 mm to 2.2 mm, and wherein the projecting length of the sub-lip is 3.0 mm to 4.5 mm and the sub-lip has a thickness of 0.4 mm to 1.0 mm.

* * * * *